United States Patent
Venigalla et al.

(10) Patent No.: US 6,656,590 B2
(45) Date of Patent: Dec. 2, 2003

(54) COATED BARIUM TITANATE-BASED PARTICLES AND PROCESS

(75) Inventors: Sridhar Venigalla, Macungie, PA (US); Kathleen A. Thrush, Dresher, PA (US)

(73) Assignee: Cabot Corporation, Boston, MA (US)

( * ) Notice: Subject to any disclaimer, the term of this patent is extended or adjusted under 35 U.S.C. 154(b) by 2 days.

(21) Appl. No.: 09/758,101

(22) Filed: Jan. 10, 2001

(65) Prior Publication Data

US 2002/0091059 A1 Jul. 11, 2002

(51) Int. Cl.$^7$ ................................. B32B 5/16
(52) U.S. Cl. ......................................... 428/403
(58) Field of Search ........................................ 428/403

(56) References Cited

U.S. PATENT DOCUMENTS

| | | |
|---|---|---|
| 3,490,927 A | 1/1970 | Kahn et al. |
| 3,642,527 A | 2/1972 | Purdes et al. |
| 3,717,487 A | 2/1973 | Hurley et al. |
| 3,725,539 A | 4/1973 | Spangenberg |
| 3,754,987 A | 8/1973 | Purdes |
| 4,643,984 A | 2/1987 | Abe et al. |
| 4,719,091 A | 1/1988 | Wusirika |
| 4,764,493 A | 8/1988 | Lilley et al. |
| 4,814,128 A | 3/1989 | Lieberman et al. |
| 4,829,033 A | 5/1989 | Menashi et al. |
| 4,832,939 A | 5/1989 | Menashi et al. |
| 4,834,928 A | 5/1989 | Su |
| 4,851,293 A | 7/1989 | Egerton et al. |
| 4,863,883 A | 9/1989 | Menashi et al. |
| 4,880,757 A | 11/1989 | Henslee et al. |
| 4,898,843 A | 2/1990 | Matushita et al. |
| 4,939,108 A | 7/1990 | Dean |
| 4,985,379 A | 1/1991 | Egerton et al. |
| 5,011,804 A | 4/1991 | Bergna et al. |
| 5,029,042 A | 7/1991 | Dean |
| 5,055,434 A | 10/1991 | Thometzek et al. |
| 5,082,810 A | 1/1992 | Bergna et al. |
| 5,082,811 A | 1/1992 | Bruno |
| 5,084,424 A | 1/1992 | Abe et al. |
| 5,086,021 A | 2/1992 | Sasaki et al. |
| 5,098,740 A | 3/1992 | Tewari |
| 5,112,433 A | 5/1992 | Dawson et al. |
| 5,155,072 A | 10/1992 | Bruno et al. |
| 5,271,969 A | 12/1993 | Ogura |
| 5,296,426 A | 3/1994 | Burn |
| 5,362,472 A | 11/1994 | Lauter et al. |
| 5,445,806 A | 8/1995 | Kinugasa et al. |
| 5,453,262 A | 9/1995 | Dawson et al. |
| 5,590,387 A | 12/1996 | Schmidt et al. |
| 5,650,367 A | 7/1997 | Fujikawa et al. |
| 5,757,610 A | 5/1998 | Wada et al. |
| 6,007,870 A | 12/1999 | Kono et al. |
| 6,129,903 A | 10/2000 | Kerchner |
| 6,214,756 B1 | 4/2001 | Adair et al. |
| 6,268,054 B1 | 7/2001 | Costantino et al. |
| 6,284,216 B1 | 9/2001 | Sakai et al. |
| 6,514,894 B1 * | 2/2003 | Adair et al. |

FOREIGN PATENT DOCUMENTS

| | | |
|---|---|---|
| DE | 199 18 091 A1 | 10/2000 |
| JP | 5058605 | 3/1993 |
| JP | 5-330824 | 12/1993 |
| WO | WO 93/16012 A1 | 8/1993 |
| WO | WO 96/06811 A2 | 7/1996 |
| WO | WO 98/35920 A1 | 8/1998 |
| WO | WO 99 67189 A1 | 12/1999 |

OTHER PUBLICATIONS

Dransfield et al., "The Superior Ageing Properties of a Plasma Synthesized, Yttria Coated Zirconia," Ceramics Today—Tomorrow's Ceramics, Materials Science Monographs. 66–B, 1159–1165, 1991.

Kayima et al., "Preparation of Monosized, Spherical, Colloidal Particles of Yttrium Barium Cuprate Superconducting Oxide Ceramic Precursors," Journal of Materials Science Letters 8, 171–172, 1989.

Selmi et al., "Sol–Gel of Powders for Processing Electronic Ceramics," Journal of the American Ceramics Society, vol. 71, No. 11, 934–937, 1988.

Shaw et al., "Preparation and Sintering of Homogeneous Silicon Nitrate Green Compacts," Journal of the American Ceramics Society, vol. 69, No. 2, 88–93, 1986.

D.A. Payne et al., "Inhibition of Grain Growth in Barium Titanate", J. Am. Ceram. Soc., p. 491, Sep. 1967.

S.A. Bruno et al., "High Performance Multilayer Capacitor Dielectrics from Chemically Prepared Powders", J. Am. Ceram. Soc. 76:1233–1241, May 1993.

T.M. Harkulich et al., "Ferroelectrics of Ultrafine Particle Size: II, Grain Growth Inhibition Studies", J. Am. Ceram. Soc., 49:295–299, Jun. 1966.

W.Hertl, "Kinetics of Barium Titanate Synthesis", J. Am. Ceram. Soc., 71:879–883, Oct. 1988.

M. Kahn, "Preparation of Small–Grained and Large–Grained Ceramics from Nb–Doped BaTiO$_3$", J. Am. Ceram. Soc., 54:452–454, Sep. 1971.

H. Kumazawa et al., "Preparation of Barium Titanate Ultrafine Particles from Amorphous Titania by a Hydrothermal Method and Specific Dielectric Constants of Sintered Discs of the Prepared Particles", J. Mat. Science, 31:2599–2602, 1996.

T.R.N. Kutty et al., "Precipitation of Rutile and Anatase (TiO$_2$) Fine Powders and Their Conversion of MtiO$_3$ (M=Ba, Sr, Ca) By the Hydrothermal Method", Mat. Chem. and Physics, 19:533–546, 1988.

S. Wada et al., "Preparation of Barium Titanate Fine Particles by Hydrothermal Method and Their Characterization", J. Ceram. Soc. of Japan, 103:1220–1227, 1995.

* cited by examiner

Primary Examiner—H. Thi Le

(57) ABSTRACT

Coated barium titanate-based particles and a process to coat the particles are provided. The coating includes a dopant metal compound that is insoluble in water under alkaline conditions. The dopant metal in the coating is selected from the group of metals which form oxides or hydroxides that are soluble in water under alkaline conditions such as tungsten, molybdenum, vanadium, and chromium. The process involves precipitating the insoluble compound from an aqueous medium as a coating on surfaces of barium titanate-based particles. The coated barium titanate-based particles may be further processed, for example, to form dielectric materials which may be used in many electronic applications such as in MLCCs applications.

15 Claims, No Drawings

COATED BARIUM TITANATE-BASED PARTICLES AND PROCESS

BACKGROUND OF THE INVENTION

The invention relates generally to dielectric materials and, more particularly, to coated barium titanate-based particles and process of producing the same.

Barium titanate-based materials, which include barium titanate ($BaTiO_3$) and its solid solutions, may be used as dielectric materials in electronic devices such as multilayer ceramic capacitors (MLCCs). Typically, barium titanate-based materials are processed in particulate form and subsequently sintered to form the dielectric material. Pure barium titanate undergoes several phase transformations which causes it to have an unstable capacitance over the typical operating temperature range for MLCC applications (−55° C. to 125° C.). To achieve a higher degree of capacitance temperature stability required in certain MLCC applications, dopant compounds may be added to pure barium titanate. Dopants may also be added to barium titanate-based materials to improve other electrical properties or for processing purposes. Typically, the dopants are metallic compounds, often in the form of oxides.

In some cases, dopant compounds are added to a barium titanate-based particulate composition in the form of discrete particles. The dopant particles may be mixed with the barium titanate-based particles and, in some cases, further milled to yield the desired particle size. The particulate mixture may then be dispersed to form a ceramic slurry which may be further processed, for example, to form a dielectric material suitable for use in MLCC applications. In some cases, the inhomogeneity of particle size and non-uniform distribution of dopant particles in such particulate mixtures may limit the ability to fabricate reliable MLCCs with thin dielectric layers having a thickness of below about 5 microns.

Certain processes have been developed which may improve the distribution of dopants in barium titanate-based compositions. These techniques may be especially important when the barium titanate-base particles have submicron particle sizes. For example, processes have been developed to coat dopant compounds on the surface of barium titanate-based particles in an aqueous-based precipitation process. In some cases, the dopant compounds are coated on to the barium titanate-base particles as oxides or hydroxides from alkaline (pH>7) aqueous solutions. Such dopant metal oxides, for example, $Y_2O_3$, $MnO_2$, and MgO, are therefore insoluble in water under these conditions. However certain dopant oxides are soluble in water at alkaline conditions, thereby limiting their ability to be coated onto particles from alkaline aqueous solutions. Furthermore, coated particles are oftentimes subjected to further processing in alkaline aqueous environments to form dielectric layers. Therefore, an alternative process may be needed to coat barium titanate-based particles with dopant metals that form oxides that are soluble in alkaline environments.

SUMMARY OF THE INVENTION

The invention provides coated barium titanate-based particles and a process to coat the particles. The coating includes a dopant metal compound that is insoluble in water under alkaline conditions. The dopant metal in the coating is selected from the group of metals which form oxides or hydroxides that are soluble in water under alkaline conditions. The group of metals includes tungsten, molybdenum, vanadium, and chromium. The process involves precipitating the insoluble compound from an aqueous medium as a coating on surfaces of barium titanate-based particles. The coated barium titanate-based particles may be further processed, for example, to form dielectric materials which may be used in many electronic applications such as in MLCCs applications.

In one aspect, the invention provides a barium titanate-based composition comprising barium titanate-based particles, wherein at least a portion of the barium titanate-based particles are at least partially coated with a coating comprising a dopant metal compound that is insoluble in water at alkaline conditions. The dopant metal is selected from the group consisting of tungsten, molybdenum, vanadium, and chromium.

In another aspect, the invention provides a method of coating barium titanate-based particles. The method includes the steps of providing an aqueous slurry of barium titanate-based particles and adding dopant metal ions to the aqueous slurry. The dopant metal is selected from the group of metals consisting of tungsten, molybdenum, vanadium, and chromium. The method further includes the step of reacting the dopant metal ions with an ionic species in the aqueous slurry to form a coating covering at least part of the surfaces of at least a portion of the barium titanate-based particles. The coating comprises a dopant metal compound that is insoluble in water at alkaline conditions.

Other advantages, aspects, and features of the invention will become apparent from the following detailed description.

DETAILED DESCRIPTION

The present invention is directed to coated barium titanate-based particles and a process to coat the particles. In the process, barium titanate-based particles are coated with at least one layer that includes a dopant metal compound which is insoluble in water under alkaline conditions (pH>7). The dopant metal is selected from the group of metals including tungsten, molybdenum vanadium, and chromium. The process utilizes barium titanate-based particles which may be dispersed in an aqueous medium to form a slurry. A solution containing the dopant element in ionic form is mixed with the aqueous slurry. The dopant element reacts with other species in the slurry to form an insoluble compound which deposits on surfaces of the barium titanate-based particles. The species in the slurry with which the dopant metal reacts may be added to the slurry or may be residual species from previous processing steps. The slurry of coated particles may be further processed, for example, to form dielectric layers in electronic components such as MLCCs.

As used herein, "barium titanate-based compositions" refer to barium titanate, solid solutions thereof, or other oxides based on barium and titanium having the general structure $ABO_3$, where A represents one or more divalent metals such as barium, calcium, lead, strontium, magnesium and zinc and B represents one or more tetravalent metals such as titanium, tin, zirconium, and hafnium. One type of barium titanate-based composition has the structure $Ba_{(1-x)}A_xTi_{(1-y)}B_yO_3$, where x and y can be in the range of 0 to 1, where A represents one or more divalent metal other than barium such as lead, calcium, strontium, magnesium and zinc and B represents one or more tetravalent metals other than titanium such as tin, zirconium and hafnium. Where the divalent or tetravalent metals are present as impurities, the value of x and y may be small, for example less than 0.1. In other cases, the divalent or tetravalent metals may be introduced at higher levels to provide a significantly identifiable compound such as barium-calcium titanate, barium-strontium titanate, barium titanate-zirconate, and the like. In still other cases, where x or y is 1.0, barium or titanium may be completely replaced by the alternative metal of appropriate valence to provide a compound such as lead titanate or barium zirconate. In other cases, the compound may have multiple partial substitutions of barium or titanium. An example of such a multiple partial substituted composition is represented by the structural formula $Ba_{(1-x-x'-x'')}Pb_xCa_{x'}Sr_{x''}O.Ti_{(1-y-y'-y'')}Sn_yZr_{y'}Hf_{y''}O_2$, where x, x', x'', y, y', and y'' are each greater than or equal to 0. In many cases, the barium titanate-based material will have a perovskite crystal structure, though in other cases it may not.

The barium titanate-based particles may have a variety of different particle characteristics. The barium titanate-based particles typically has an average primary particle size of less than about 10 microns; in some cases, the average primary particle size is less than about 1.0 micron; in some cases, the average primary particle size may be less than about 0.5 micron; most preferably, the average primary particle size is less than about 0.1 micron. In some embodiments, the barium titanate-based primary particles will agglomerate and/or aggregate to form aggregates and/or agglomerates of aggregates. At times, it may be preferable to use barium titanate-based particles in the coating process that are not strongly agglomerated and/or aggregated such that the particles may be relatively easily dispersed, for example, by high shear mixing. Such barium titanate-based particles are described in commonly-owned, co-pending U.S. patent application Ser. No. 08/923,680, filed Sep. 4, 1997, which is incorporated herein by reference in its entirety.

The barium titanate-based particles may also have a variety of shapes which may depend, in part, upon the process used to produce the particles. For example, milled barium titanate-based particles generally have an irregular, non-equiaxed shape. In other cases, the barium titanate-based particles may be equiaxed and/or substantially spherical.

The barium titanate-based primary particles may be produced according to any technique known in the art including hydrothermal processes, solid-state reaction processes, sol-gel processes, as well as precipitation and subsequent calcination processes, such as oxalate-based processes. In some embodiments, it may be preferable to produce the barium titanate-based particles using a hydrothermal process. Hydrothermal processes generally involve mixing a barium source with a titanium source in an aqueous environment to form a hydrothermal reaction mixture which is maintained at an elevated temperature to promote the formation of barium titanate particles. When forming barium titanate solid solution particles hydrothermally, sources including the appropriate divalent or tetravalent metal are also added to the hydrothermal reaction mixture. Certain hydrothermal processes may be used to produce substantially spherical barium titanate-based particles having a particle size of less than 1.0 micron and a uniform particle size distribution. Suitable hydrothermal processes for forming barium titanate-based particles have been described, for example, in commonly-owned U.S. Pat. Nos. 4,829,033, 4,832,939, and 4,863,883, which are incorporated herein by reference in their entireties.

The barium titanate-based particles may be dispersed in an aqueous medium to form a slurry prior to the coating process. The barium titanate-based particles generally are present in amounts between about 5 and about 50 weight percent based on the total weight of the slurry; in some cases, between about 10 and about 30 weight percent barium titanate-based particles based on the total weight of the slurry are present. In many cases, the pH of the slurry will be greater than 7. The major component of the aqueous medium is water, though other components such as ionic species, may be present in lesser amounts. The other components may be residual from previous processing steps or may be added to the slurry, for example, to adjust pH or to react with the dopant ions. If the barium titanate-based particles are produced hydrothermally, it is possible to maintain the particles in the hydrothermal aqueous medium for coating. Thus, in these cases, the particles are not dried and do not have to be redispersed.

The coating process, according to one embodiment of the invention, involves adding a solution containing the dopant element in ionic form to the aqueous slurry. The dopant ions may be the ionic form of any metal selected from the group that forms oxides or hydroxides that are soluble in water under alkaline conditions. Such metals include, but are not limited to, tungsten, molybdenum, vanadium and chromium. Any solution that includes dopant metals in ionic form may be added to the slurry. The dopant ions react with other species in the slurry to produce an insoluble compound. The insoluble compound precipitates from the slurry as a coating on the barium titanate-based particle surfaces because the energy required to nucleate the compound is minimized at particle surfaces. In some embodiments, all of the barium titanate-based particles in the slurry may be coated, at least to some extent.

The reactive species in the slurry may be any cation present in the slurry that can react with the dopant ion to form an insoluble compound. The reactive species may be separately added to the slurry in solution form (e.g., barium hydroxide ($Ba(OH)_2$), calcium hydroxide ($Ca(OH)_2$), or strontium hydroxide ($Sr(OH)_2$)). In other cases, the species that reacts with the dopant ion may be residual from previous processing. For example, when the barium titanate-based particles are produced in a hydrothermal process and are maintained in an aqueous environment for the coating process, residual barium ions ($Ba^{2+}$) from the hydrothermal process may remain in the slurry.

Any insoluble compound including the dopant metal, which may be produced from a precipitation reaction, may be coated onto the particle surface. In some embodiments, the insoluble compounds have the general structure $ADO_4$, where A represents one or more divalent metals such as barium, calcium, lead, strontium, magnesium and zinc, and D represents one or more dopant metals such as tungsten, molybdenum, and chromium. Particularly preferred insoluble compounds having this general structure include $BaMoO_4$ and $BaWO_4$. In other embodiments, the insoluble compound may have other chemical structures, such as $Ba_2V_2O_7$.

When the insoluble compound includes an A group element, the A/B ratio for the composition is generally greater than 1.0 because of the presence of A group element in the coating layer. As used herein, A/B ratio is defined as the ratio of divalent metals (e.g., alkaline earth metals such as Ba, Ca, etc.) to tetravalent metals (e.g., Ti, Zr, Sn, etc.) in the overall dielectric composition. In certain applications, it is desirable to maintain the A/B ratio of greater than 1.0, for example, to improve compatibility of the dielectric composition with base metal electrodes. Therefore, this process may eliminate the need to separately add solid A group compounds to make the ratio greater than 1.0 as in conventional processes.

The weight percentage of the dopant present may be selected to provide the composition with the desired electrical properties. Generally, the barium titanate-based composition includes less than about 5 weight percent of the dopant element based upon the total weight of the barium titanate-based particulate composition. For example, in some cases, the dopant element weight percentage is between about 0.0025 and about 1.0 based upon the total weight of the barium titanate-based particulate composition; and, in some cases the dopant element weight percentage is between about 0.0025 and about 0.1 based upon the total weight of the barium titanate-based particulate composition.

The coating may be formed in a variety of thicknesses depending in part upon the weight percentage of the dopant present and the size of the barium titanate-based particle. The thickness of the dopant compound coating, for example, may be between about 0.1 nm and about 10.0 nm; in some cases, the thickness may be between about 0.5 nm and about 5.0 nm. In certain embodiments, it may be desirable to produce a coating over the entire particle surface. In some embodiments, the coating may have a uniform thickness such that the thickness of the coating varies by less than 20%. In other cases, the thickness may vary by larger amounts across the surface of an individual particle. Particularly in cases where the dopant percentage is low (i.e. less than 0.5 weight percent), the thickness of the coating may vary over different portions of the particles and, sometimes, portions of the particle may not be coated. Also, when particles are irregularly shaped, for example due to aggregation and/or agglomeration, the thickness may vary over different portions of the particles. Some particles of the barium titanate-based composition may not be coated at all.

The coating may include one or more layers having a distinct chemical composition. In embodiments in which the particles are coated with multiple distinct layers, the layers may be formed successively on top of one another. For example, the coating may include a first layer of $Y_2O_3$, a second layer of $MnO_2$, and a third layer of $BaMO_4$. In these cases, conventional processes may be used to form one or more of the layers, particularly metal oxide layers that are insoluble in alkaline conditions. The coating process according to the invention may be employed to provide more than one layer of the coating. For example, a $BaWO_4$ layer and a $BaMO_4$ layer may be coated upon particle surfaces in subsequent steps according to the coating process of the invention. When depositing multiple layers to form a coating, the particles may be washed between coating processes.

After the coating procedure, the slurry of barium titanate-based particles may be further processed as known in the art produce a desired final product. For example, additives such as dispersants and/or binders may be added to the slurry to form a castable slip. In some embodiments, a portion of the aqueous phase may be eliminated from the slurry to form a wet cake. In other embodiments, the coated barium titanate-based particles may be recovered from the slurry and dried. Ultimately, the barium titanate-based particles may be used in the formation of dielectric layers in electronic applications such as MLCCs.

The present invention will be further illustrated by the following example, which is intended to be illustrative in nature and are not to be considered as limiting the scope of the invention.

EXAMPLE

Coated barium titanate particles of the present invention were produced. The barium titanate particles were coated with a $BaMoO_4$ layer and a $BaWO_4$ layer utilizing the process of the present invention.

Barium titanate ($BaTiO_3$) particles were produced in a hydrothermal process by mixing a barium source and a titanium source in a hydrothermal reactor to form a reaction mixture which was maintained at a temperature between about 150° C. and about 200° C. until the reaction completed. The resulting barium titanate particles had an average particle size of about 0.3 microns. The barium titanate particles were dried, then redispersed in 1500 g of $Ba(OH)_2$ solution having a concentration of 0.2 moles Ba/kg solution. The solution had a pH of about 13.5. The solution containing the particles was continuously agitated by a high shear mixer to form an aqueous slurry.

22.3 g of ammonium molybdate (($NH_4)_2MoO_4$) solution having a concentration of 0.25 moles Mo/kg solution was then added to the continuously agitated aqueous slurry over a time period of about 10 minutes. The following chemical reaction between the molybdenum ions and the barium ions produced $BaMoO_4$ which then formed a coating layer on the surface of the barium titanate particles which was insoluble in the alkaline environment.

$$Ba^{2+}+Mo^{6+}+4OH^-=BaMoO_4+4H^+$$

22.3 of ammonium paratungstate (($NH_4)_{10}W_{12}O_{41} \cdot 5H_2O$) having a concentration of 0.25 moles Mo/kg solution was then added to the continuously agitated aqueous slurry over a time period of about 10 minutes. The following chemical reaction between the tungsten ions and the barium ions produced $BaWO_4$ which then formed a coating over the $BaMoO_4$ coating layer. The $BaWO_4$ coating was insoluble in the alkaline environment.

$$Ba^{2+}+W^{6+}+4OH^-=BaWO_4+4H^+$$

The slurry was filtered and the coated particles were washed using de-ionized water. The filtering and washing step was repeated. The coated barium titanate particles were dried and recovered. The coated barium titanate particles were analyzed in bulk form and the presence of tungsten and molybdenum was confirmed.

The example illustrates the formation of a first dopant coating layer of a molybdenum compound and a second dopant coating layer of a tungsten compound on the surface of barium titanate-based particles. Both the tungsten compound and the molybdenum compound are insoluble in water under alkaline conditions.

Although particular embodiments of the invention have been described in detail for purposes of illustration, various changes and modifications may be made without departing from the scope and spirit of the invention. Accordingly, the invention is not to be limited except by the appended claims.

What is claimed is:

1. A composition comprising:
   barium titanate-based particles having a first composition; and
   coatings formed on respective surfaces of the barium titanate-based particles, the coatings comprising a dopant metal compound having a second composition and being insoluble in water at alkaline conditions, wherein the dopant metal is selected from the group consisting of tungsten, molybdenum, vanadium, and chromium.

2. The composition of claim 1, wherein the dopant metal is selected from the group consisting of tungsten and molybdenum.

3. The composition of claim 1, wherein the dopant metal compound has the structure $ADO_4$, wherein A represents one or more divalent metals selected from the group VY consisting of barium, calcium, lead, strontium, magnesium and zinc, and D represents one or more dopant metals selected from the group consisting of tungsten, molybdenum, vanadium, and chromium.

4. The composition of claim 3, wherein the dopant metal compound is selected from the group consisting of $BaMoO_4$ and $BaWO_4$.

5. The composition of claim 1, wherein the coating comprises the dopant metal in amounts between about 0.0025 and about 1.0 weight percent of the total weight of the coated barium titanate-based particles.

6. The composition of claim 1, wherein the coating has a thickness between about 0.5 nm and about 5.0 nm.

7. The composition of claim 1, wherein at least some of the coatings entirely cover respective surfaces of at least some of the barium titanate-based particles.

8. The composition of claim 1, wherein the coating comprises multiple chemically distinct layers.

9. The composition of claim 1, wherein the coated barium titanate-based particles are dispersed in an aqueous slurry.

10. The composition of claim 1, wherein the barium titanate-based particles have an average particle size of less than about 0.5 micron.

11. The composition of claim 1, wherein the barium titanate-based particles have an average particle size of less than about 0.1 micron.

12. The composition of claim 1, wherein the barium titanate-based particles are substantially spherical.

13. The composition of claim 1, wherein the dopant metal compound is $Ba_2V_2O_7$.

14. The composition of claim 1, wherein at least some of the coatings only partially cover respective surfaces of at least some of the barium titanate-based particles.

15. The composition of claim 1, wherein the dopant metal is selected from the group consisting of tungsten, molybdenum and vanadium.

* * * * *